J. A. ROBINSON.
Hand Plow.
No. 12,428.
Patented Feb. 20, 1855.
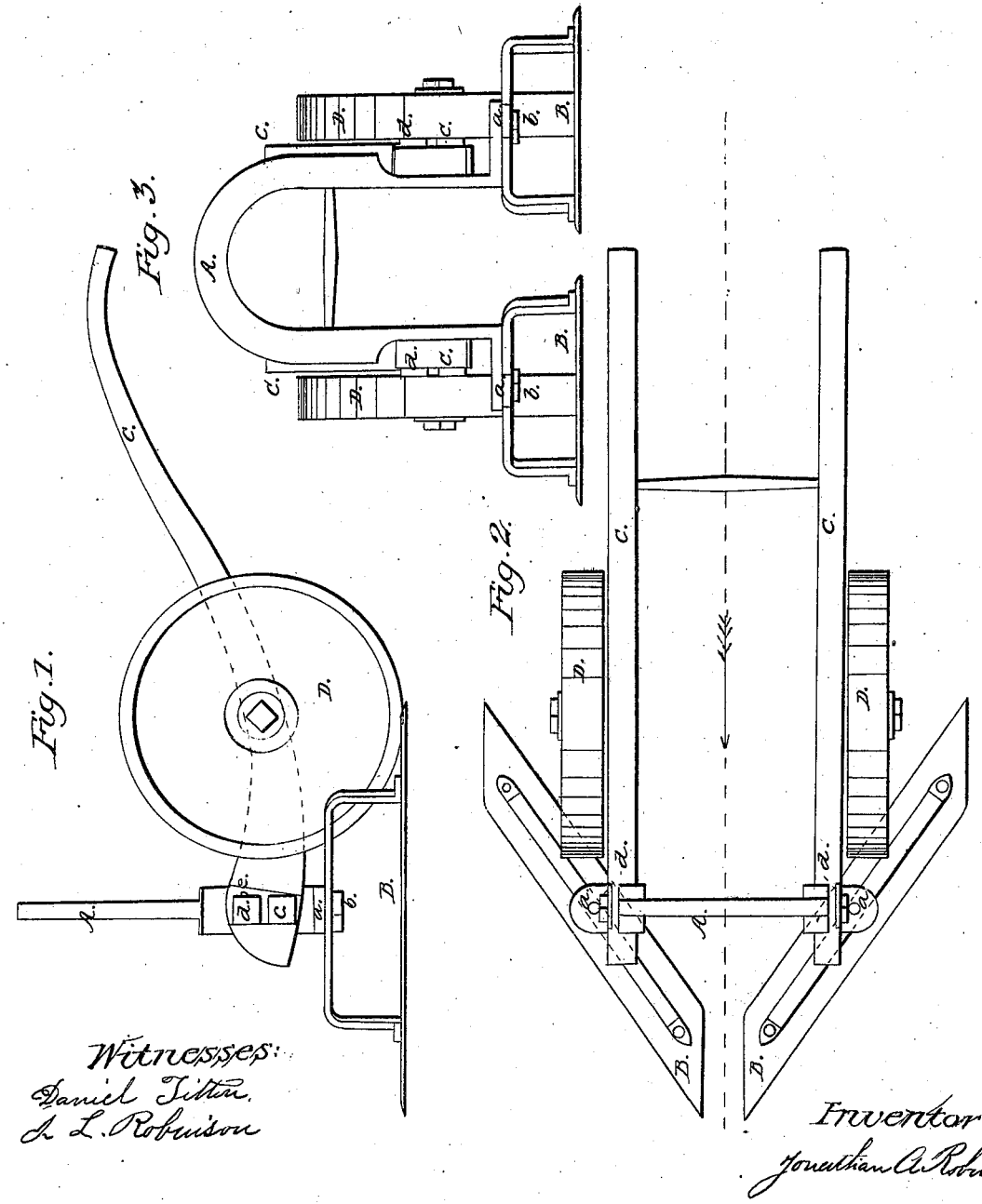

UNITED STATES PATENT OFFICE.

JONATHAN A. ROBINSON, OF POPLIN, NEW HAMPSHIRE.

IMPROVEMENT IN HAND-CULTIVATORS.

Specification forming part of Letters Patent No. 12,428, dated February 20, 1855.

*To all whom it may concern:*

Be it known that I, JONATHAN A. ROBINSON, of Poplin, in the county of Rockingham and State of New Hampshire, have invented a new and useful Instrument for Weeding Rows of Vegetables or other Crops, of which the following is a full, clear, and exact description, reference being had to the annexed drawings, making part of this specification, in which—

Figure 1 is a side view, Fig. 2 a plan, and Fig. 3 a front view, of the implement.

To enable others skilled in the art to make and use my machine, I will proceed to describe its construction and operation.

It consists of two horizontal knives or cutters attached to the two ends of a yoke of sufficient height to pass over the top of the plants, the knives being adjusted to run as near to the plants as may be desired, and the whole being made to travel upon wheels in a manner which will now be described.

A is a yoke or bent bar of the form represented in Fig. 3, to the lower ends of which are secured the cutters B, the latter being allowed to swivel around the points $a$, the nuts $b$ serving to hold them secure when placed in the required position. By this means the knives may be made to cut more or less distant from the rows of plants.

In order that the knives may be made to dip more or less into the ground, the yoke A is arranged in the following manner.

C are the handles by which the machine is guided, and which carry the short shaft upon which the wheels B turn.

C is a square-headed pin, which passes through the lower end of the handles C, and screws into the yoke A. Upon this pin the latter is allowed a limited motion, by which means the cutters may be made to dip more or less beneath the surface. $d$ is another square-headed pin, which passes through a slot, $c$, in the butt of the handles, and also screws into the yoke A. The length of the slot $c$ thus limits the motion which may be given to the yoke A for the purpose of inclining the cutters. By tightening this screw the cutters are held in place.

Operation: In Fig. 2 the red line represents the row of plants to be weeded. The instrument is then wheeled along by the operator in the direction of the arrow, so that the knives shall cut close upon each side of the plants, the distance between the knives being so adjusted that the plants shall not be injured by them. In this way, the knives being kept sharp, the young weeds with which seed-beds are often filled are speedily exterminated, and the plants themselves are economically and expeditiously cultivated.

I do not claim the yoke A nor the knives B; but

What I do claim as my invention, and desire to secure by Letters Patent, is—

The within-described instrument for weeding and cultivating plants in rows, the same consisting substantially of the combination of the yoke A with the knives B, constructed and operating in the manner and for the purpose set forth.

JONATHAN A. ROBINSON.

Witnesses:
DANIEL TITTON,
T. L. ROBINSON.